US007528600B2

(12) United States Patent
Sen et al.

(10) Patent No.: US 7,528,600 B2
(45) Date of Patent: May 5, 2009

(54) SYSTEM AND METHOD FOR DOWNHOLE TIME-OF-FLIGHT SENSING, REMOTE NMR DETECTION OF FLUID FLOW IN ROCK FORMATIONS

(75) Inventors: Pabitra N. Sen, Ridgefield, CT (US); Yi-Qiao Song, Ridgefield, CT (US); John P. Horkowitz, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 115 days.

(21) Appl. No.: 11/608,469

(22) Filed: Dec. 8, 2006

(65) Prior Publication Data

US 2008/0136409 A1  Jun. 12, 2008

(51) Int. Cl.
*G01V 3/00* (2006.01)
(52) U.S. Cl. ........................... 324/303; 324/306
(58) Field of Classification Search ............... 324/303, 324/306
See application file for complete search history.

(56) References Cited

U.S. PATENT DOCUMENTS

| 5,428,291 | A  | * | 6/1995  | Thomann et al. ............. 324/303 |
| 6,118,272 | A  |   | 9/2000  | Taicher |
| 6,518,758 | B1 |   | 2/2003  | Speier et al. |
| 6,528,995 | B1 |   | 3/2003  | Speier et al. |
| 6,531,869 | B1 |   | 3/2003  | Speier et al. |
| 6,538,438 | B1 |   | 3/2003  | Speier et al. |
| 6,642,715 | B2 |   | 11/2003 | Speier et al. |
| 6,710,596 | B2 |   | 3/2004  | Speier et al. |
| 6,841,996 | B2 | * | 1/2005  | Madio et al. ................ 324/303 |
| 6,856,132 | B2 |   | 2/2005  | Appel et al. |
| 6,897,652 | B2 | * | 5/2005  | Appel et al. ................ 324/303 |
| 2003/0077224 | A1 |   | 4/2003  | Pines et al. |

(Continued)

FOREIGN PATENT DOCUMENTS

GB  2343256  5/2000

(Continued)

OTHER PUBLICATIONS

Horkowitz, John P. et al., Residual Oil Saturation Measurements in Carbonates with Pulsed NMR Logs, The Log Analyst, Mar.-Apr. 1997, pp. 73-83.

(Continued)

*Primary Examiner*—Louis M Arana
(74) *Attorney, Agent, or Firm*—Darla P. Fonseca; Jaime Castano; Dale Gaudier

(57) ABSTRACT

A system and method for measuring fluid flow in a wellbore in an earth formation using time-of-flight (TOF) sensing and remote detection nuclear magnetic resonance (NMR) techniques, by applying a magnetic field to the formation to polarize spins present in a portion of the formation, providing an encoding shell in the formation, selecting an encoding volume from the encoding shell, applying an encoding signal to excite the spins in the encoding volume, introducing a time delay to the encoding signal, providing a detection shell in the formation, applying a detection signal to the detection shell, detecting an NMR signal generated by the migration of spins from the encoding shell to the detection shell, and collecting TOF data corresponding to time elapsed from when a spin is encoded to when the spin reaches the detection shell.

26 Claims, 4 Drawing Sheets

U.S. PATENT DOCUMENTS

2006/0097722 A1    5/2006    Scheven

FOREIGN PATENT DOCUMENTS

GB          2403544        1/2008

OTHER PUBLICATIONS

Granwehr, J. et al., Time-of-Flight Flow Imaging Using NMR Remote Detection, Physical Review Letters, 95, 075503, 2005.

Seeley, Juliette et al., Remotely Detected High-Field MRI of Porous Samples, Journal of Magnetic Resonance, 167, pp. 282-290, 2004.

Moule, Adam J. et al., Amplification of Xenon NMR and MRI by Remote Detection, Proceedings of the National Academy of Sciences of the United States of America, Aug. 2003, vol. 100, No. 16, pp. 9122-9127.

<http://www.rigzone.com/news/insight/insight.asp?i_id=26>, Underbalanced Drilling—Introduction, pp. 1-12.

* cited by examiner

SYSTEM AND METHOD FOR DOWNHOLE TIME-OF-FLIGHT SENSING, REMOTE NMR DETECTION OF FLUID FLOW IN ROCK FORMATIONS

FIELD OF THE INVENTION

The present invention relates in general to the field of well-logging of earth wellbores and, more particularly, to well-logging instruments and methods for measuring fluid flow in rock formations while drilling or well logging with nuclear magnetic resonance (NMR) techniques.

BACKGROUND

Well logging provides various parameters that may be used to determine the "quality" of a rock formation from a given wellbore. Hydraulic permeability, a measure of how easily the fluids will flow through the pores of the formation, is a particularly important factor in determining the commercial viability of a specific well site. One of the most direct methods of measuring permeability is by measuring fluid flow rates in the formation. Because flow rates are difficult to determine, NMR measurements of flow rate can be used to assist in the process of modeling the flow rates and thereby determine the permeability of the formation. Accordingly, NMR is emerging as an invaluable tool for the characterization of formations in geophysical exploration, both for well logging and logging-while-drilling (LWD).

There are two types of flow that occur in boreholes—either natural flow between the formation and the borehole, or induced flow resulting from pumping fluids out of the formation by a Modular Formation Dynamics Tester (MDT)™ or similar tool. Most conventional applications of downhole NMR flow analysis are limited to situations in which the flow is induced by external means, such as the MDT tool. There are a number of circumstances, however, in which flow occurs naturally due to a pressure differential between the formation and the wellbore.

Natural flow typically occurs in three situations: Under-Balanced Drilling (UBD) conditions, wells with open-hole completions, or cross-flow between formation zones along the trajectory of the wellbore. In the case of UBD, the wellbore pressure is kept below the reservoir pressure, which allows the reservoir fluids to enter the wellbore during drilling and eliminates invasion of the drilling fluids into the formation. UBD is becoming increasingly popular because of the many advantages over the conventional over-balanced drilling.

Open-hole completion is a process of well completion that has no casing or liner set across the reservoir formation, allowing the produced fluids to flow directly into the wellbore. Natural flow occurs during reservoir production when the wellbore pressure is reduced below formation pressure and the fluids flow naturally from the formation into the borehole. Many horizontal wells created in competent rock are completed open-hole.

The third case of natural flow occurs when two layers along the wellbore are at significantly different pressures. In this situation, there is no significant flow out of the bore hole, yet there is cross-flow between the different layers. It is quite common in water flood operations to have significant pressure differentials between different zones (e.g., greater than 3000 p.s.i.). Although the well is actually flowing downhole (or more precisely, cross flowing), this flow is usually not recognized during drilling because all of the fluid moves from the high pressure flooded zone, into the wellbore, and then out of the wellbore into a low pressure zone (e.g., where the water flood is not present).

In UBD conditions, wells with open hole completions, wells exhibiting cross flow between layers of higher versus lower formation pressure, and other natural flow conditions, fluid flow measurements would be made using the natural flow of the fluids between the formation and the borehole. These flow measurements would provide for the estimation of a number of continuous flow based properties, including, but not limited to, matrix permeability measurements along the borehole and relative permeability in a continuous manner along the borehole. In natural flow conditions, NMR flow measurements, when combined with production logging methods, would also provide the positive identification and contribution of water or hydrocarbon inflow from natural fractures. Accordingly, there is a need for monitoring natural fluid flow resulting from a pressure differential between the formation and the borehole.

Conventional NMR scans can be considered as taking place in two steps. The first step is the manipulation of nuclear spins, for example, by a series of RF and magnetic field gradient pulses. In the second step, the resulting spin magnetization is detected. The first step is often called the encoding step since it is meant to modulate the spins in certain pattern. Usually, a systematic variation of the encoding segment of the sequence is executed and corresponding signal measured. Analysis of the signal as a result of the known pattern of modulation allows the extraction of the properties of the nuclear spins and the spin-containing materials.

Although NMR has developed into a very versatile analytical tool, NMR is a relatively insensitive detection method compared to others because the NMR signal depends on the population difference between two spin states. Unfortunately, many approaches to improving NMR sensitivity result in optimizing the encoding process at the expense of the detection process, or vice versa.

Therefore, it is a desire to provide a system and method of using NMR analysis to measure natural fluid flow under well logging and LWD conditions. Furthermore, there is a need for a system and method for NMR that can optimize both the encoding and detecting procedures and overcome the inherent limitations of traditional NMR devices.

SUMMARY OF THE INVENTION

In view of the foregoing and other considerations, the present invention relates to measuring fluid flow in rock formations while drilling or well logging with NMR techniques.

Accordingly, a system and method for measuring natural flow utilizing time-of-flight (TOF) sensing, remote detection NMR techniques are provided. The system includes a magnet that provides a magnetic field to polarize spins present in the portion of the formation that is subject to the magnetic field. A first NMR subsystem provides an encoding shell, is able to transmit an encoding signal to excite the polarized spins within the encoding shell, and can introduce a time delay. A second NMR subsystem provides a detection shell, and can transmit a detection signal to allow detection of an NMR signal corresponding to spins migrating from the encoding shell to the detection shell. The system also includes circuitry to derive fluid flow based on the NMR signal and a transit time associated with the migration of spins from the encoding shell to the detection shell.

A method for measuring fluid flow in a wellbore in an earth formation utilizing TOF sensing and remote detection NMR techniques is provided. The method includes applying a magnetic field to the formation to polarize spins present in a portion of the formation, providing an encoding shell in the formation, selecting an encoding volume from the encoding shell, applying an encoding signal to excite the spins in the encoding volume, introducing a time delay to the encoding signal, providing a detection shell in the formation, applying a detection signal to the detection shell, detecting an NMR signal generated by the migration of spins from the encoding shell to the detection shell, and collecting TOF data corresponding to time elapsed from when a spin is encoded to when the spin reaches the detection shell.

A system for measuring fluid flow in a wellbore in an earth formation utilizing TOF sensing and remote detection NMR techniques is provided. The system includes a magnet that provides a magnetic field to polarize spins present in a portion of the formation. An NMR system includes a radiofrequency (RF) generator, an RF receiver, and an RF coil system to project an RF magnetic field into the formation. The system also includes switching electronics to rapidly switch the frequency of the RF generator, the RF receiver, and the RF coil system from a first state in which the NMR system provides an encoding signal to excite the polarized spins within the encoding shell to a second state in which the NMR system provides a detection shell, and provides a detection signal to allow detection of an NMR signal corresponding to spins migrating from the encoding shell to the detection shell. The system also includes circuitry to derive fluid flow rate based on the NMR signal and a series of transit times associated with the migration of spins from the encoding shell to the detection shell.

The foregoing has outlined the features and technical advantages of the present invention so that the detailed description of the invention that follows may be better understood. Additional features and advantages of the invention will be described hereinafter that form the subject of the claims of the invention.

BRIEF DESCRIPTION OF THE DRAWINGS

The foregoing and other features and aspects of the present invention will be best understood with reference to the following detailed description of specific embodiments of the invention when read in conjunction with the accompanying drawings, wherein.

DETAILED DESCRIPTION

Figure 1:
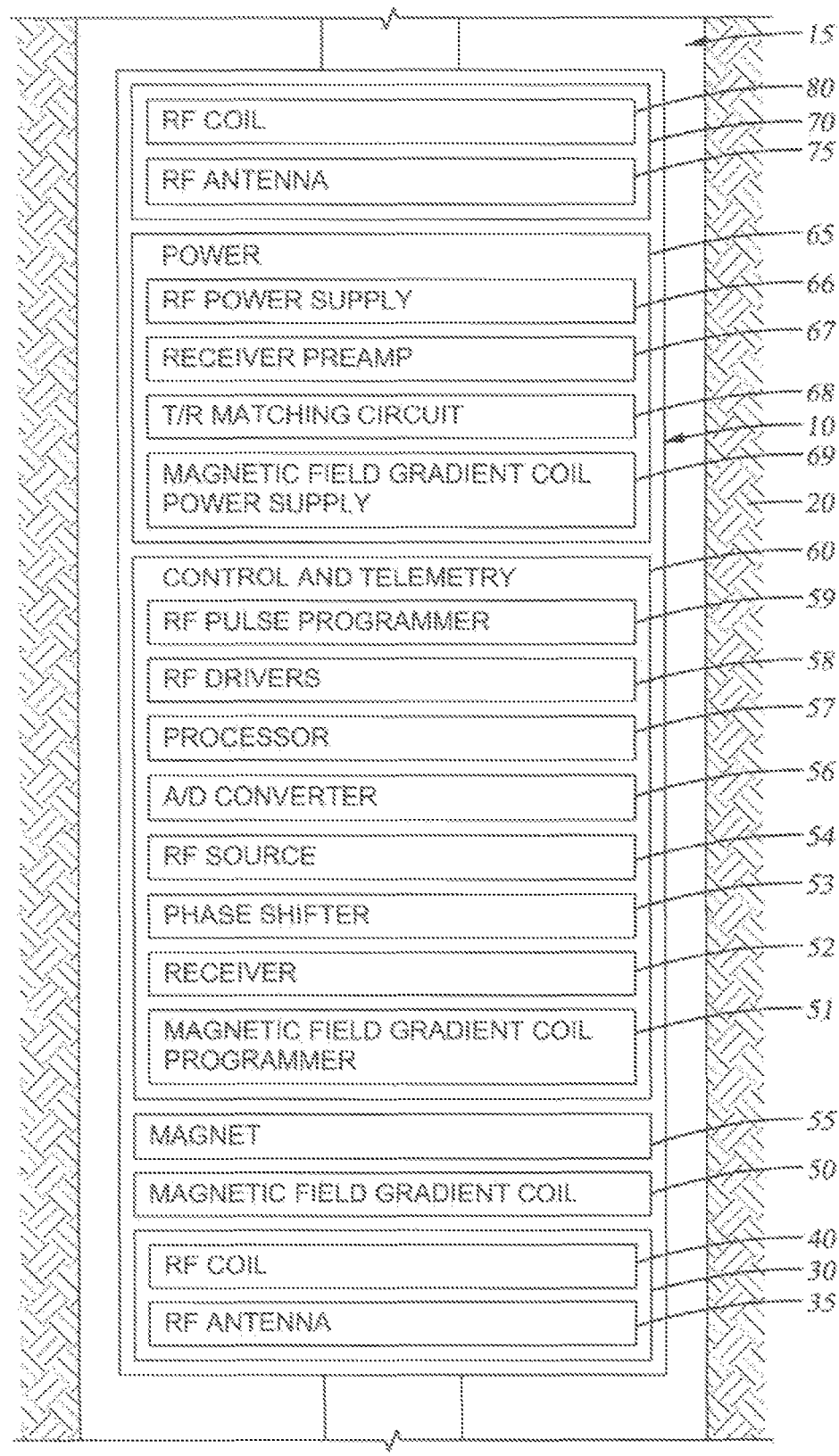
FIG. 1 is a partial cross-sectional schematic view of an exemplary embodiment of the well-logging tool of the present invention; however, the locations of certain parts such as magnets, RF coils, and gradient coils are illustrative only and the invention is not limited to the locations shown.

Refer now to the drawings wherein depicted elements are not necessarily shown to scale and wherein like or similar elements are designated by the same reference numeral through the several views.

As used herein, the terms "up" and "down"; "upper" and "lower"; and other like terms indicating relative positions to a given point or element are utilized to more clearly describe some elements of the embodiments of the invention. Commonly, these terms relate to a reference point as the surface from which drilling operations are initiated as being the top point and the total depth of the well being the lowest point.

The present invention utilizes time-of-flight (TOF) flow detection NMR and remote detection NMR techniques to measure fluid flow in earth formations, including fluid flow caused by the pressure differential between the rock formation and wellbore resulting from UBD conditions, cross-flow between formation zones along the trajectory of the wellbore, from an open-hole completion operation, and other conditions causing fluid flow.

In conventional NMR applications, a sample volume is subjected to both the encoding and detection steps while the spins within the sample are in the same or very nearly same location. Typically, the encoding and detection steps use the same RF coil. In contrast, remote detection NMR spatially separates the two steps by employing two independent NMR subsystems to execute the encoding and detection separately. In conventional applications of remote detection, the encoding system applies RF and gradient pulses to a specific region of the sample, the encoding volume. Next, the materials containing the nuclear spins are transported to a second location in space, which is inside the detection subsystem. The detection subsystem will apply another series of pulses to measure the signal. The entire procedure may be repeated with different encoding parameters to systematically change the encoding effects and provide a more complete data set.

To use remote detection techniques, the NMR system needs to be able to switch between two shells quickly. By "shell" we mean a region in space in which the spins are manipulated by the encoding or detecting subsystems and, depending on the magnet design, can be a partial or complete cylindrical wall having a thickness of a few millimeters and extending along the length of the NMR antenna. In a first embodiment of the present invention, shown in FIG. 1, the NMR logging tool employs two subsystems that work in synchronization. Each NMR subsystem will be able to generate and transmit RF currents to the respective coils to irradiate the respective samples with magnetic field pulses to manipulate the nuclear spins. In a second embodiment, shown in FIG. 4, the NMR logging tool incorporates electronics to allow fast switching of the frequency of the RF generator, RF receiver, and the RF coil system.

FIG. 1 is a partial cross-section of a first embodiment of the TOF sensing, remote detection NMR well-logging tool of the present invention, generally denoted by the numeral 10. During operation, tool 10 may be run within borehole 15 created in rock formation 20. Tool 10 is an NMR logging device operable to take measurements versus depth or time, or both, of one or more physical quantities in or around borehole 15 and rock formation 20, including the natural fluid flow through formation 20. Tool 10 may be run in the wellbore by various conveyance means including without limitation wireline and tubulars. The measured data or logs may be transmitted through a wireline (not shown) to the surface and recorded there or, alternatively, in logging while drilling situations, mud pulse or other telemetry methods known in the art can be used to send the data uphole, or record the data downhole to be retrieved later when the tool 10 is brought to the surface.

Tool 10 includes two RF subsystems: encoding subsystem 30 and detection subsystem 70. The first RF subsystem, encoding subsystem 30, comprises RF antenna 35 which in turn comprises one or more RF coils 40. The components of encoding subsystem 30 are preferably selected and optimized for encoding fluid samples for NMR analysis. Similarly, the second RF subsystem, detection subsystem 70, includes RF antenna 75. RF antenna 75 comprises one or more RF coils 80. The components of detection subsystem 70 are preferably selected and optimized for the detection of encoded data transmitted from encoding subsystem 30. RF coils 40 and 80 are preferably integrated with magnet assembly 55 to project an RF magnetic field with a non-zero component perpendicular to the static magnetic field generated by magnet 55. The RF systems are preferably tuned to the respective Larmor frequencies of the nuclear spins subject to encoding and detection. For example, RF coils 40 in encoding subsystem 30 are preferably able to resonate at the Larmor frequency of the spins present in the encoding shell. Similarly, RF coils 80 in detection subsystem 70 are preferably able to resonate at the Larmor frequency of the spins present in the detection shell. The RF coils shown in FIG. 1 for the two subsystems may also be the same set of physical coils. The drawing is not intended to specify the actual coil locations nor their relative order on the tool.

Figure 2:
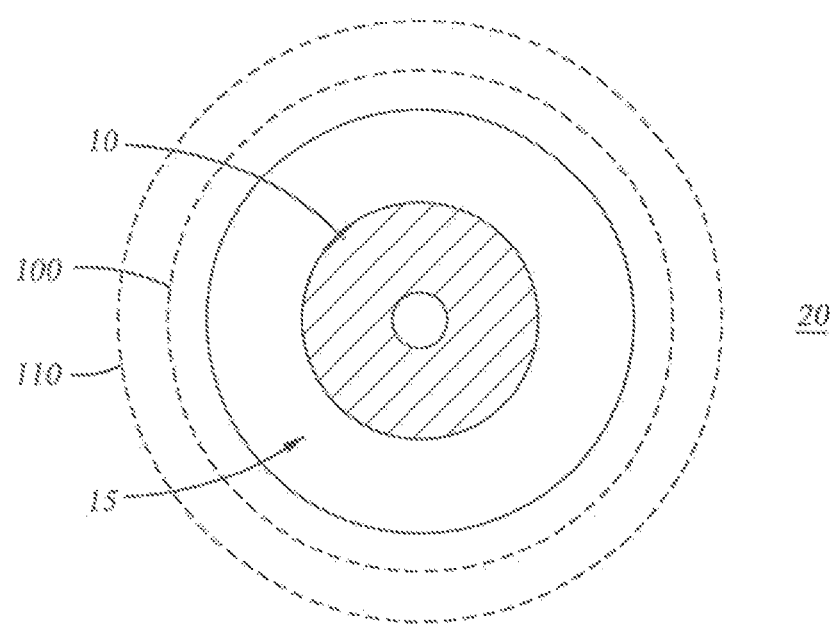
FIG. 2 is a plan view of an exemplary embodiment of the present invention, depicting the encoding and detection shells.

RF antennas 35 and 75 may be any antenna suitable for an NMR logging tool, including high resolution antennas or multi-frequency, multi-shell antennas. RF antennas 35 and 75 may each operate at one or more frequencies that correspond to one or more diameters or depths of investigation (DOI) or shells. The shells are independent measurement volumes that form concentric arcs in front of the antenna. As shown in FIG. 2, encoding shell 110 corresponds to RF antenna 35 (encoding subsystem 30) and detection shell 100 corresponds to RF antenna 75 (detection subsystem 70). The frequencies of antennas 35 and 75 may be selected to determine the DOI for detection shell 100 and encoding shell 110, i.e., the distance logging tool 10 measures into formation 20 from the face of tool 10 or the borehole wall. As with conventional LWD NMR tools, NMR signals may be measured from individual shells. For example, in conventional LWD NMR tools, these signals may be analyzed to obtain spin relaxation and diffusion properties for different shells. Signals from multiple shells may also be combined for analysis.

As shown in FIG. 1, tool 10 contains magnet 55, preferably a large permanent magnet operable to create a strong static magnetic polarizing field in formation 20. Magnet 55 produces a magnetic field that decreases with distance from tool 10. Magnet 55 is preferably designed to project a field gradient along the direction of flow to be detected. The magnetic field is preferably maintained throughout the pathway of fluid from encoding shell 110 to detection shell 100, as discussed below. When a spin moves in the spatially varying magnetic field, the local quantization direction and field value can be different. For example, when the spin is polarized along the local magnetic field at one instance, slow movement through a magnetic field with changing direction allows the spin to follow the direction of the local magnetic field. However, when the movement is at high speed or the field gradient is large, the spin may not have enough time to follow the changing direction, a situation that results in decoherence and reduction of NMR signal.

Such a situation is similar to a stationary spin experiencing a time-varying magnetic field, both in magnitude and direction of the field. When the frequency of the time-varying field is comparable to the local Larmor frequency, significant relaxation of the NMR signal will occur. The condition necessary to avoid significant signal decay is generally known as the adiabatic condition, given by:

$$\frac{|v \cdot gradB|}{|B|} < 0.1,$$

where "grad B" is the gradient of the magnetic field B and v is the velocity of the flowing fluid. When this condition is satisfied, the moving spins will generally follow the changing direction of the local magnetic field and do not suffer significant decay. Passage through a zero (or very low) field region is one of the situations where significant decay can occur. This is because the very low Larmor frequency associated with a close-to-zero field makes it is very difficult to maintain the adiabatic condition, except for extremely slow movements. As a result, it is desirable in designing the magnet 55 for tool 10 to avoid having a zero or near zero magnetic field along the entire fluid flow path.

Another mechanism for loss of coherence is the spin lattice relaxation since flow from the encoding region to the detection region will invariably take some time. The decay of the encoded signal may take an exponential form, such as exp(−t/T1), where t is the transit time and T1 is the spin-lattice relaxation time of the fluid in the formation. As a result, it is desirable to choose the encoding region and the flow velocity to minimize the transit time. Also, it is difficult to perform the experiment if the transit time is much larger than the spin-lattice relaxation time. Furthermore, since the magnetic field is spatially dependent and T1 may depend on the magnetic field, the part of the pathway with the shortest T1 may dominate the signal decay. In many sedimentary rocks, T1 of the water protons is field-dependent and shorter at lower field strengths. As a result, it is desirable to avoid zero or very low field strengths along the entire flow path when contemplating the design of the magnet 55.

Tool 10 may also include one or more magnetic field gradient coils 50. Magnetic field gradient coils 50 may be used to project a magnetic field gradient into formation 20 at the location of the NMR "sweet spot" to enhance the encoding and/or detection process, e.g., maximize NMR resolution.

Control and telemetry subsystem 60 contains electronics for controlling, programming, and synchronizing encoding subsystem 30, detection subsystem 70 and magnetic field gradient coil subsystem 50, among other components. Components of control and telemetry subsystem 60 may include a RF pulse programmer 59, RF drivers 58, processor 57, A/D converter 56, RF source 54, phase shifter 53, receiver 52, and a magnetic field gradient coil programmer 51, among other components. Control and telemetry subsystem 60 may synchronize the transmission of encoding and detection signals in order to collect accurate TOF data.

Power subsystem 65 provides power to the components of tool 10. Power subsystem 65 may include an RF power supply 66, receiver preamp 67, T/R matching circuit 68, and magnetic field gradient coil power supply 69, among other components.

Tool 10 utilizes TOF flow detection and remote detection NMR techniques to measure fluid flow caused by the pressure differential between the rock formation and wellbore resulting from UBD conditions, cross-flow between formation zones along the trajectory of the wellbore, from open-hole completion operations, and other conditions causing fluid flow.

In operation, tool 10 is lowered into borehole 15, which has been drilled into rock formation 20 to measure the flow of fluids in the rock formation while drilling or logging. As tool 10 passes through borehole 15, magnet 55 creates a strong magnetic polarizing field inside formation 20. The hydrogen nuclei of the water and hydrocarbons that may be present in formation 20 are basically electrically charged spinning protons that create tiny magnetic fields. Accordingly, when the strong external magnetic field generated by magnet 55 passes through a formation containing these fluids, these spinning protons align themselves along the magnetic field.

RF antenna 35 (in encoding subsystem 30) produces an encoding RF pulse sequence to invert or rotate the aligned protons (e.g. water protons) in encoding shell 110. The operator may select which portion of the encoding shell 110, e.g., encoding volume, to subject to subsequent detection. For example, the operator may choose to invert a selected slice of encoding shell 110 at a known distance from the borehole wall. Alternatively, if tool 10 includes multiple magnetic field gradient coils 50 and multiple RF coils 40, magnetic field gradients may be used in conjunction with multiple RF pulses to encode the one or more regions in the encoding volume. The operator may also choose to encode the entire encoding volume by a combination of gradient and RF pulses, detect the relevant NMR signals, and then analyze the signals for a 3D image of the flow field.

Once the operator has made a selection in the encoding shell 110, a wait time is executed during which the resonance frequency of the RF pulse sequence and the electronic hardware is changed to that needed for the detecting subsystem 70. This wait time is part of the transit time. The inverted spins may then flow out of encoding shell 110, following the streamlines into detection shell 100. As discussed below, if this migration occurs during the transit time of the pulse sequence, the spins give rise to a signal corresponding to the volume of fluid that has traveled from encoding shell 110 to detection shell 100. The signal will be detected for a suite of transit times. The plot of the signal versus transit time characterizes the distribution of the time for fluid to move from encoding shell 110 to detection shell 100.

RF antenna 75 (detection subsystem 70) applies a detection signal to detection shell 100 to detect a detection response. The detection signal may be an RF pulse train. The detection response may be free induction decay (FID), a spin echo, or any other appropriate NMR detection response. An FID signal is an NMR signal that is generated as excited nuclei relax. The encoded sample adds to nuclear spins aligned with the external magnetic field. This excess population causes an observable magnetization that the RF pulses from the encoding subsystem 30 or detecting subsystem 70 can rotate into the plane orthogonal to the equilibrium state (i.e., xy-plane). This magnetization in the orthogonal plane is detectable by the NMR antenna and leads to an FID signal.

Figure 3:
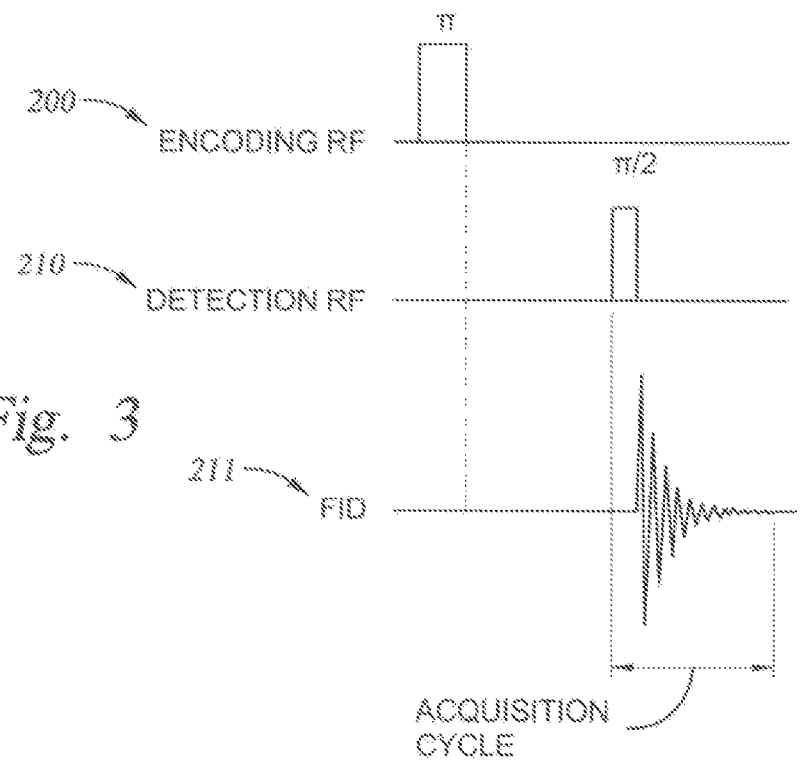
FIG. 3 shows exemplary embodiments of the encoding and detection signals of the present invention; however, the locations of certain parts such as magnets, RF coils, and gradient coils are illustrative only and the invention is not limited to the locations shown.

FIG. 3 illustrates an example sequence for measuring the time of travel or time-of-flight between encoding shell 110 and detection shell 100. Encoding signal 200 represents a pulse sequence applied to the encoding volume, and detection signal 210 represents a pulse sequence applied to the detection volume. NMR signal 211 represents the FID response detected from detection shell 100. An acquisition cycle includes detection signal 210 and NMR signal 211, and is repeated some number of times for each encoding event. The number of acquisition cycles, N, should be sufficient to allow the encoded volume to pass through the detection volume. The time between adjacent detection signals 210 is preferably greater than or equal to the residence time of the spins in detection shell 100.

In operation, the encoding pulse (e.g., $\pi$ pulse or inversion pulse) rotates the magnetization to the $-z$ axis (inverted) before the fluid flows in the direction of the detection shell. While in transit, the magnetization undergoes longitudinal relaxation while trying to return to equilibrium along the $+z$ direction. When the fluid is in the detection shell 100, a $\pi/2$ pulse rotates the spins into the xy-plane where they produce an FID response and are detected. If the travel time is longer than that of a few longitudinal relaxation periods, then the magnetization will likely have already re-aligned in the $+z$ direction before reaching detection shell 100 and the encoded information will have been lost. The same is true if the spins travel through zero or very low field strengths in which T1 is extremely short. In that case the inverted spins will likely have relaxed back to equilibrium before reaching detection shell 100. Other than those two special cases, however, the pulse sequence of FIG. 3 generally leads to an FID, from which TOF can be calculated. In addition, as is well known in the art, a spin echo sequence can be used as part of the detection signal to enhance the NMR signal.

At times before the inverted fluid from encoding shell 110 has reached detection shell 100, the signal detected is from the unperturbed fluid that was in detection shell 100 before encoding was applied. This leads to a maximum signal intensity. The signal drops at longer transit times, representing the detection of fluid samples that were inverted in encoding shell 110 by the inversion pulse. These travel times indicate the time scale of flow as well as the spreading of the sample during travel due to the heterogeneity of the streamlines resulting from the pore connectivity and geometry of the formation. The packets flowing at a slower rate arrive later at detection shell 100 and also remain there longer. The distribution of the travel times directly reflects the flow distribution.

Flow distribution of downhole fluids through porous formations can be quite complex. A complex flow distribution may arise, for example, because downhole fluids are often a mixture of water, crude oils, and natural gases. Those components are generally immiscible and their movement in a porous rock can depend on various factors. Natural gases may dissolve in crude oils at certain environmental conditions. Each phase can occupy its own pore space in rocks and the flow of one phase may be restricted by the presence of other phases. As a result, the permeability of the individual phases depends on the relative saturation of the phases and the overall porosity and permeability. Such behavior is often described by the relative permeability. For example, the relative permeability generally increases with the saturation of the phase. Measurement of relative permeability is extremely important for the design of production strategy and reservoir engineering.

In the case of multiphase fluids in the formation, the flow of each individual phases may be different from the other phases. For example, the volume flow velocity is generally proportional to the relative permeability. As a result, the fluid phase with a higher relative permeability may exhibit a fast linear velocity and the fluid with a lower relative permeability may travel slower. The faster fluid will travel the distance from the encoding region to the detection region in a shorter time than the slow fluid, resulting in two arrival fronts. Such flow pattern will be measured by the detection subsystem as two subsequent valleys in the plot of the signal vs. transit time. Those two valleys indicate the arrival of the two phases. Such experiments can then measure the velocity of the individual phases.

The flow of the sample is accordingly characterized by the time-of-flight (TOF) of the spins from the time of encoding to the time when the spins reach detection shell 100, allowing the TOF pattern to be recorded. The circuitry to derive fluid flow rate based on the TOF data, and any other calculations or measurements, may be located in tool 10 or located in a system on the surface. For example, processor 57 may be designed to make these fluid flow calculations. Alternatively, tool 10 may simply transmit or store the measurements so that the necessary data processing can be performed by devices located outside of borehole 20.

One consequence of remote detection is that the received signal is dependent on the flow pattern of the sample. Fluid from the far end of the sample (relative to the detector) during encoding will arrive later than like fluid at the near end, and no signal will be detected from a stagnant region that is not effectively connected to the flow field. Heterogeneity in the flow field causes some flow paths to be preferred. This fluid behavior can be a result of the structural heterogeneity present in certain rocks (a factor that is critical in determining the crude oil recovery efficiency and rate). Most importantly, such heterogeneity might not be readily determined from a pore-level structural characterization, e.g., T2 and D T2 NMR.

Many types of heterogeneities will produce significant dispersion of the flow, and arrival times of fluids from different flow pathways can be very different. For example, fluids in the high permeability channels (or regions) will exhibit much higher flow velocity than those fluids in the tighter flow paths with low permeability. Regions with smaller pores, such as micropores found in many carbonate rocks or dead-end pores, will contribute little to the flow. The flow experiments described herein are able to measure the transit time distribution and thus determine the fraction of the total pore space (i.e., porosity) that contributes to flow and the fraction that does not. The fraction of porosity that does not contribute to flow is often called bound fluid and can be estimated from conventional (non-flowing) NMR measurements using T2-cutoff. However, such estimates from NMR are in fact a correlation with a static measurement that does not involve moving the fluid, and thus is prone to error. For instance, short T2 can be a result of a strong surface relaxivity and it is not exclusively due to small pore sizes. In comparison, the flow measurement discussed in this disclosure is a direct measurement of the flow distribution and the bound fluid fraction can be obtained directly.

The presence of stagnant fluid means that not all of the encoded signal will arrive at the detection and thus will not contribute to the detected valleys. Integration of the area of the valleys is a direct measure of the volume of the fluid that has moved from the encoding region to the detection region. The ratio of this integral and the total porosity measured by NMR or other well-logging methods can be used to obtain the movable water fraction. The bound water fraction is then one minus the movable water fraction.

The TOF measurements can also be used to characterize permeability. The flow velocity $\vec{v}_i$ of the $i^{th}$ component is given by Darcy's Law:

$$\vec{v}_i = -\frac{kk_i}{\mu_i} \, grad \, p$$

Here k is permeability (a property of the rock), $k_i$ the relative permeability, and $\mu_i$ the viscosity of the $i^{th}$ component (the surface tension effect between the different fluids has been ignored but can be incorporated if wished, as in any standard treatment).

For flow due to a one-dimensional pressure gradient, assuming the pressure of the formation is $p_f$ at a distance $r_f$, and that of the borehole with the radius $r_0$ is $p_b$, the flow velocity is given by:

$$v_i = -\frac{kk_i}{\mu_i} \frac{p_f - p_b}{r_f - r_0}$$

For radial flow with cylindrical symmetry, $$v_i = -\frac{kk_i}{\mu_i} \frac{p_f - p_b}{r \ln(r_f/r_0)}$$

For radial flow with spherical symmetry, $$v_i = -\frac{kk_i}{\mu_i} \frac{p_f - p_b}{r^2(r_0^{-1} - r_f^{-1})}$$

It is clear that the measurement of flow velocity can be used to distinguish flow regimes by their radial dependence, and to determine permeability and relative permeability. For example, one may determine the local pressure gradient by two pressure measurements at nearby locations, and at the same time use NMR to determine the flow velocity between the two locations of the pressure measurements. Then the one-dimensional formula can be used to extract k $k_i/\mu_i$.

Figure 4:
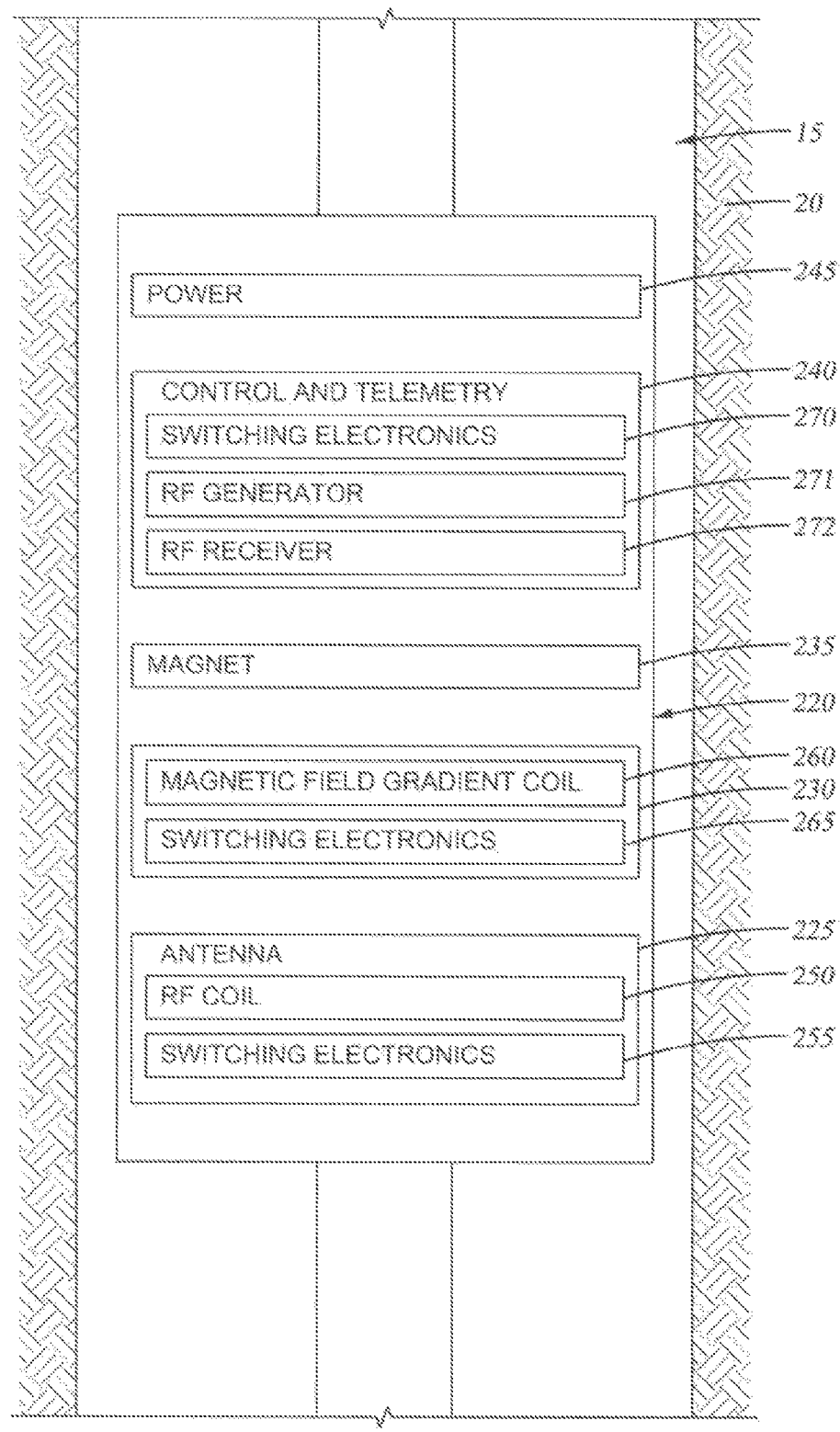
FIG. 4 is a partial cross-sectional schematic view of another exemplary embodiment of the well-logging tool of the present invention.

FIG. 4 is a partial cross-section of a second embodiment of the TOF sensing, remote detection NMR well-logging tool of the present invention, generally denoted by the numeral 220. NMR logging tool 220 includes RF antenna 225, magnetic field gradient coil subsystem 230, magnet 235, control and telemetry subsystem 240, and power subsystem 245. Instead of synchronized NMR subsystems (e.g., as shown in FIG. 1 and described above in connection with the first embodiment), tool 220 uses switching electronics to switch between the encoding shell 110 and the detection shell 100. Switching electronics 255 and 265 allow fast switching of the frequency of RF coil system 250 and magnetic field gradient coil system 260, respectively. Switching electronics 270 allows fast switching of the frequency of relevant components of control and telemetry system 240, including the RF generator 271 and the RF receiver 272. The switching electronics allow RF antenna 225 to switch between being an encoder at one frequency and a detector at a different frequency, i.e., one optimized for detection. The various switching electronics allow tool 220 to switch between transmission of encoding signals to the encoding shell 110 and the reception of detection signals from the detection shell 100 to thereby perform a remote detection measure of the fluid flow.

Figure 5:
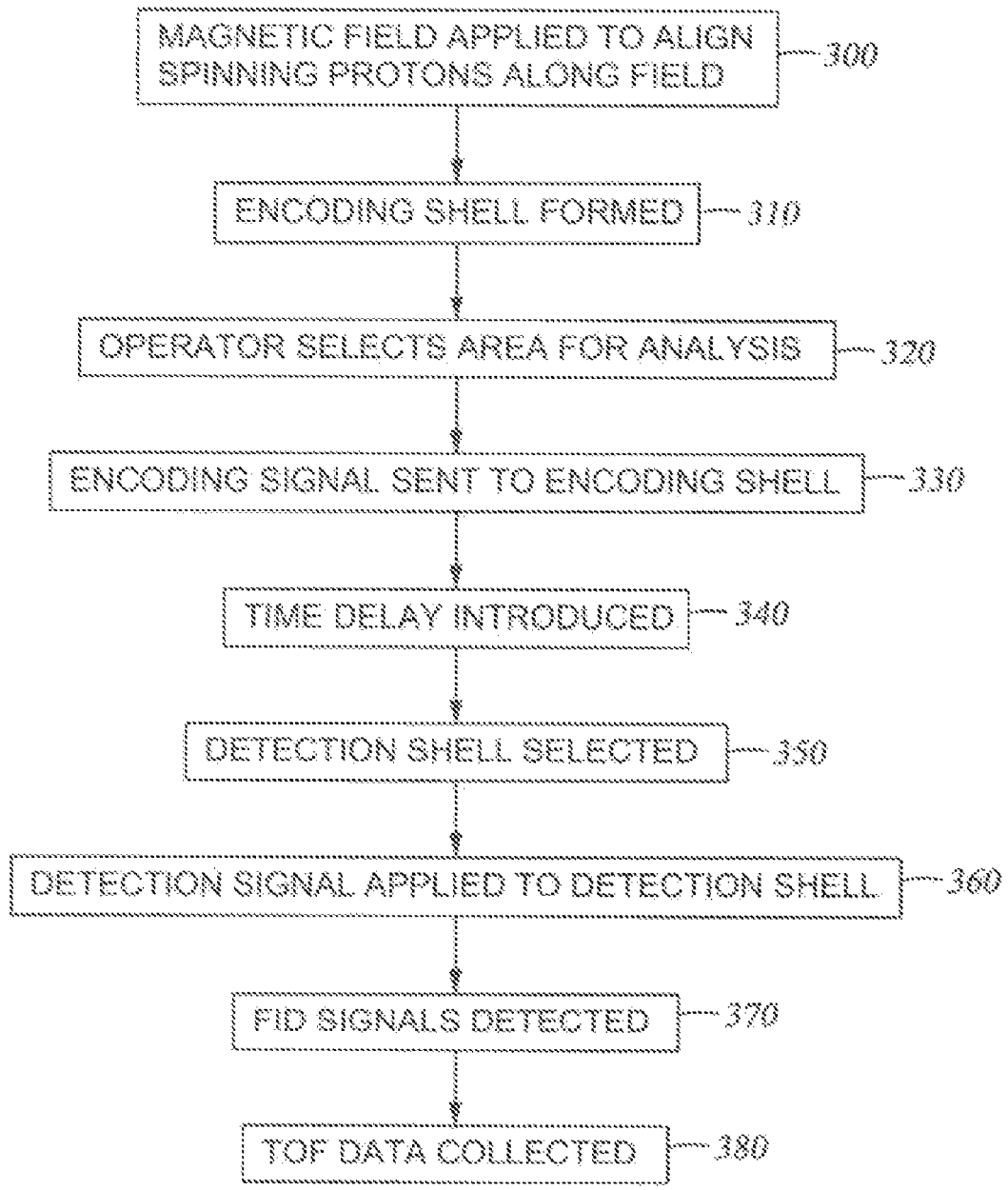
FIG. 5 is a flow chart illustrating steps for determining fluid flow characteristics in accordance with the present invention.

FIG. 5 is a flow diagram of a method of using TOF sensing, remote detection NMR to determine fluid flow rate. At step 300, a strong polarizing magnetic field is applied to the rock formation to align the spinning protons along the magnetic field. At step 310, an encoding shell 110 is formed in the rock formation. At step 320, the operator selects the encoding shell 110 for analysis. Next, at step 330, an encoding signal is applied to the selected encoding shell 110 to invert the aligned protons. At step 340, a time delay is introduced, i.e., a selected delay between excitation pulses to allow measurements as a function of transit time. At step 350, a detection shell 100 is selected in the rock formation. At step 360, a detection signal is applied to the detection shell 100. Subsequently, at step 370, FID signals are detected as the inverted protons migrate from the encoding shell 110 to the detection shell 100. At step 380, the TOF data is collected, allowing a user to determine the flow distribution of the fluids within the rock formation.

The present invention can be operated in conventional NMR mode or remote NMR mode (meaning NMR measurements made at spatially different locations for one data acquisition cycle). In conventional NMR mode, the encoding and detection subsystems operate independently to directly perform NMR in the respective shells. This is similar to the operation of the conventional NMR logging tools. In remote NMR mode, the encoding system applies RF pulses to change the state of the nuclear spins in the rock formation within the sweet spot of the encoding system, and then the detection system monitors the signal from the fluid that has flowed into the detection system. Deviation from the steady state signal in the detector is attributed to the fluid that was manipulated (or encoded) by the encoding system.

From the foregoing detailed description of specific embodiments of the invention, it should be apparent that a novel method and system for time-of-flight sensing of fluid flow by remote detection NMR have been disclosed. Although specific embodiments of the invention have been disclosed herein in some detail, this has been done solely for the purposes of describing various features and aspects of the invention, and is not intended to be limiting with respect to the scope of the invention. It is contemplated that various substitutions, alterations, and/or modifications, including but not limited to those implementation variations which may have been suggested herein, may be made to the disclosed embodiments without departing from the scope of the invention as defined by the appended claims.

What is claimed is:

1. A system to determine properties of a formation and/or wellbore fluids using time-of-flight (TOF) sensing and remote detection nuclear magnetic resonance (NMR) techniques, the system comprising: a magnet to polarize spins; an encoding subsystem operable to encode the spins in an encoding shell; a detection subsystem operable to detect an NMR signal from the spins in a detection shell; a well logging tool adapted for positioning in a wellbore, the well logging tool carrying the magnet, the encoding subsystem and the detection subsystem; and circuitry operable to derive fluid flow rate based on the NMR signal and the time-of-flight associated with the migration of the spins from the encoding shell to the detection shell.

2. The system of claim 1, wherein the NMR signal is a free induction decay (FID) signal.

3. The system of claim 1, wherein the encoding subsystem comprises an antenna operable at a frequency corresponding to the encoding shell.

4. The system of claim 1, wherein the detection subsystem comprises an antenna operable at a frequency corresponding to the detection shell.

5. The system of claim 1, wherein encoding subsystem further comprises an antenna operable to project a magnetic field into the formation at the Larmor frequency of the spins in the encoding shell.

6. The method of claim 5 wherein the fluid flow rate is determined while drilling the wellbore.

7. The system of claim 1, wherein the encoding subsystem further comprises a magnetic field gradient coil operable to project a magnetic field gradient into the formation to encode the spins in the encoding shell.

8. The system of claim 1, wherein the detection subsystem further comprises an antenna operable to project a magnetic field into the formation at the Larmor frequency of the spins in the detection shell.

9. The system of claim 1, wherein the formation properties comprise permeability, relative permeability, porosity, and bound fluid volume.

10. The system of claim 1, wherein the migration of the spins is, relative to the wellbore, radially directed, axially directed, or a combination of both.

11. The system of claim 1, wherein the encoding subsystem encodes the spins in only a selected portion of the encoding shell.

12. The system of claim 1, wherein the detection subsystem detects an NMR signal from the spins in only a selected portion of the detection shell.

13. The system of claim 1, wherein the well logging tool is conveyed by a wireline.

14. The system of claim 1, wherein the well logging tool is conveyed by a tubular.

15. A system to determine properties of a formation and/or wellbore fluids using time-of-flight (TOF) sensing and remote detection nuclear magnetic resonance (NMR) techniques, the system comprising: a magnet to polarize spins; an NMR subsystem having an antenna operable to encode the spins in an encoding shell and to detect an NMR signal from the spins in a detection shell; switching electronics to switch the frequency of the antenna; a well logging tool adapted for positioning in a wellbore, the well logging tool carrying the magnet and the NMR subsystem; and circuitry operable to derive fluid flow rate based on the NMR signal and the time-of-flight associated with the migration of the spins from the encoding shell to the detection shell.

16. A method to determine properties of a formation and/or wellbore fluids using time-of-flight (TOF) sensing and remote detection nuclear magnetic resonance (NMR) techniques, comprising: disposing a well logging tool in a wellbore defined by a formation; applying a magnetic field to the formation to polarize spins; applying an encoding signal to the spins in an encoding volume in the formation; applying a detection signal to a detection volume in the formation; detecting an NMR signal from the detection volume; deriving fluid flow rate based on the NMR signal and the time-of-flight associated with the migration of the spins from the encoding volume to the detection volume; and using the fluid flow rate to determine formation properties.

17. The method of claim 16, wherein the formation properties comprise relative permeability, permeability, porosity, and bound fluid volume.

18. The method of claim 16, wherein the NMR signal is a free induction decay (FID) signal.

19. The method of claim 16, wherein:
applying an encoding signal includes applying a first radiofrequency (RF) pulse sequence; and applying a detection signal includes applying a second radiofrequency (RF) pulse sequence.

20. The method of claim 16, wherein the time between adjacent detection signals is greater than or equal to the residence time of the spins in the detection volume.

21. The method of claim 16, wherein a sufficient number of acquisition cycles are conducted to allow the encoded spins in the encoded volume to pass through the detection volume.

22. The method of claim 16, wherein the NMR signal is a spin echo sequence.

23. The method of claim 16, wherein applying an encoding signal comprises applying a magnetic field gradient to the formation.

24. The method of claim 16, further comprising selecting an encoding volume that is some portion of an encoding shell.

25. The method of claim 16, further comprising selecting a detection volume that is some portion of a detection shell.

26. The method of claim 16, wherein the migration of the spins is, relative to the wellbore, radially directed, axially directed, or a combination of both.

* * * * *